United States Patent [19]

Miller et al.

[11] 4,130,527
[45] Dec. 19, 1978

[54] METHOD OF TREATING A POLYMER LATEX TO REMOVE UNREACTED MONOMER BY TREATMENT IN A COLUMN

[75] Inventors: Robert S. Miller, Chappaqua, N.Y.; Francis J. Doyle, Newark, Del.

[73] Assignee: Stauffer Chemical Company, Westport, Conn.

[21] Appl. No.: 865,648

[22] Filed: Dec. 29, 1977

[51] Int. Cl.² .............................................. C08L 27/00
[52] U.S. Cl. .......................... 260/29.6 R; 260/29.7 R; 528/500
[58] Field of Search ...................... 260/29.6 R, 29.7 R; 528/500

[56] References Cited

U.S. PATENT DOCUMENTS

| T959,008 | 7/1977 | Chandra | 528/500 |
|---|---|---|---|
| 3,849,232 | 11/1974 | Kessler et al. | 159/13 A |
| 3,956,249 | 5/1976 | Goodman et al. | 528/500 |
| 4,007,022 | 2/1977 | Schleicher et al. | 55/41 |
| 4,032,497 | 6/1977 | Kidoh et al. | 260/29.6 R |

FOREIGN PATENT DOCUMENTS

| 2531111 | 8/1974 | Fed. Rep. of Germany | 260/29.6 R |
|---|---|---|---|
| 2440957 | 3/1976 | Fed. Rep. of Germany | 260/29.6 R |
| 2607675 | 9/1976 | Fed. Rep. of Germany | 260/29.6 R |
| 2098078 | 8/1977 | Japan | 260/29.6 R |
| 2105106 | 9/1977 | Japan | 260/29.6 R |
| 1466515 | 3/1977 | United Kingdom | 260/29.6 R |

Primary Examiner—M. J. Welsh
Attorney, Agent, or Firm—Richard P. Fennelly

[57] ABSTRACT

Residual unreacted monomer, such as vinyl chloride monomer, is removed from an aqueous latex of polymer, such as polyvinyl chloride, by allowing the latex to flow as a thin liquid film down the inner surface of a substantially vertical column at subatmospheric pressure countercurrent to an ascending flow of steam. If desired, packing may be inserted in the column to enhance the removal of residual monomer.

10 Claims, 3 Drawing Figures

METHOD OF TREATING A POLYMER LATEX TO REMOVE UNREACTED MONOMER BY TREATMENT IN A COLUMN

BACKGROUND OF THE INVENTION

1. Field of the Invention

The present invention is a process for the removal of unreacted, residual monomer, for example, vinyl chloride monomer, from aqueous latex compositions containing the polymer, for example, polyvinyl chloride.

2. Description of the Prior Art

The production of a latex of a synthetic polymer is conventionally carried out by polymerizing the constituent monomer or monomers for the desired polymer or copolymer using an aqueous emulsion or micro suspension process. Seed latex, after polymerization, has been reported in the scientific literature to often contain a certain quantity of residual, unreacted monomer. In cases where the monomer is a low boiling liquid (for example, vinyl chloride) and the polymerization has been carried out under autogenous monomer pressure, much of the residual monomer in the reaction vessel at the end of the polymerization may be removed by venting (for example, via a monomer trap) into suitable recovery equipment. Nevertheless, even in these cases, the resulting latex may still contain a certain quantity of residual monomer after venting. This residual monomer may be dissolved in the aqueous phase and/or may have been absorbed by the polymer particles.

It is desirable to remove as much of the residual monomer from the polymer as possible, particularly if the quality of the polymer is improved thereby, if the monomer is expensive and merits recovery, or if the presence of even very small quantities of monomer in the polymer is deemed to be undesirable for other reasons. It is also often desirable to significantly reduce the residual monomer content of the latex since this places a lower burden on the equipment employed in subsequent work-up stages for removing and trapping the last traces of residual monomer.

A number of recent patents and publications have focused on various techniques for removal of such residual unreacted monomer, for example, vinyl chloride monomer (hereinafter abbreviated "VCM") from the polymer product, for example, polyvinyl chloride (hereinafter abbreviated "PVC") or from the aqueous reaction medium containing the product. A recent example of a technique for steam sparging of PVC wet cake is shown in U.S. Pat. No. 3,956,249 to D. Goodman et al. This process is directed to monomer removal after the polymer product has been isolated from the aqueous reaction medium.

Some publications have contained a general suggestion of removal of monomer from aqueous latices containing the polymer without revealing the precise details as to how such an operation is to be accomplished: Rubber World, February 1976, pp. 9–10; Chem. Engineering Progress, Vol. 71, No. 9, pp. 54–62 (1975); and Chemecology, p. 5 (October 1975).

The use of rather expensive and complex trayed towers in which steam sparging of the aqueous latex could take place were suggested in Japan Plastics, pp. 9–12 (August–September 1976) and German Offenlegungsschrift No. 2,521,780.

The use of subatmospheric pressure alone in a particular type of trayed cylindrical tower was described in U.S. Pat. No. 4,007,022 to R. Schleicher et al.

The use of merely heating the aqueous dispersion of PVC was suggested in German Offenlegungsschrift No. 2,429,776, whereas the use of rapid, forced countercurrent flow of the aqueous dispersion of polymer and steam in a long tube was suggested in German Offenlegungsscrift No. 2,440,957 and in corresponding Belgian Pat. No. 842,887. Such a latter technique requires pumping equipment not needed in the present process as will be apparent upon a further reading of this specification.

The gravity flow of polymer dispersion in the form of a film has been suggested in certain prior art patents. In U.S. Pat. No. 4,017,355 to T. Kiyota, however, a noncondensible inert gas such as air, nitrogen or helium is used to remove residual monomer, and the technique is distinguished from conventional steam sparging procedures (Col. 1, lines 14–25 and Col. 3, lines 29–30). In Belgian Pat. No. 847,198 and corresponding U.S. Defensive Publication No. T959,008 a process is described which involves spraying latex into the top of a vertical column and allowing it to flow down the column in a thin film. A hot inert gas, such as steam, flows countercurrent to the flow inside the tube and also contacts the latex as it is sprayed into the top of the tube. The present invention is a process in which the latex need not be sprayed into the top of the column as will become apparent upon a further reading of this specification.

SUMMARY OF THE PRESENT INVENTION

The present process is a method of treating polymer latex to remove residual unreacted monomer therefrom which comprises allowing the latex to flow as a thin film down the inner surface of a substantially vertical column without any substantial mechanical shear stress being imparted to the latex, such as by pumping the latex when in the form of an atomized spray, at subatmospheric pressure countercurrent to an ascending flow of steam.

DESCRIPTION OF THE DRAWINGS

The present invention will be further understood upon examination of the Drawings which form a portion of this specification wherein.

DESCRIPTION OF PREFERRED EMBODIMENTS OF THE INVENTION

Figure 1:
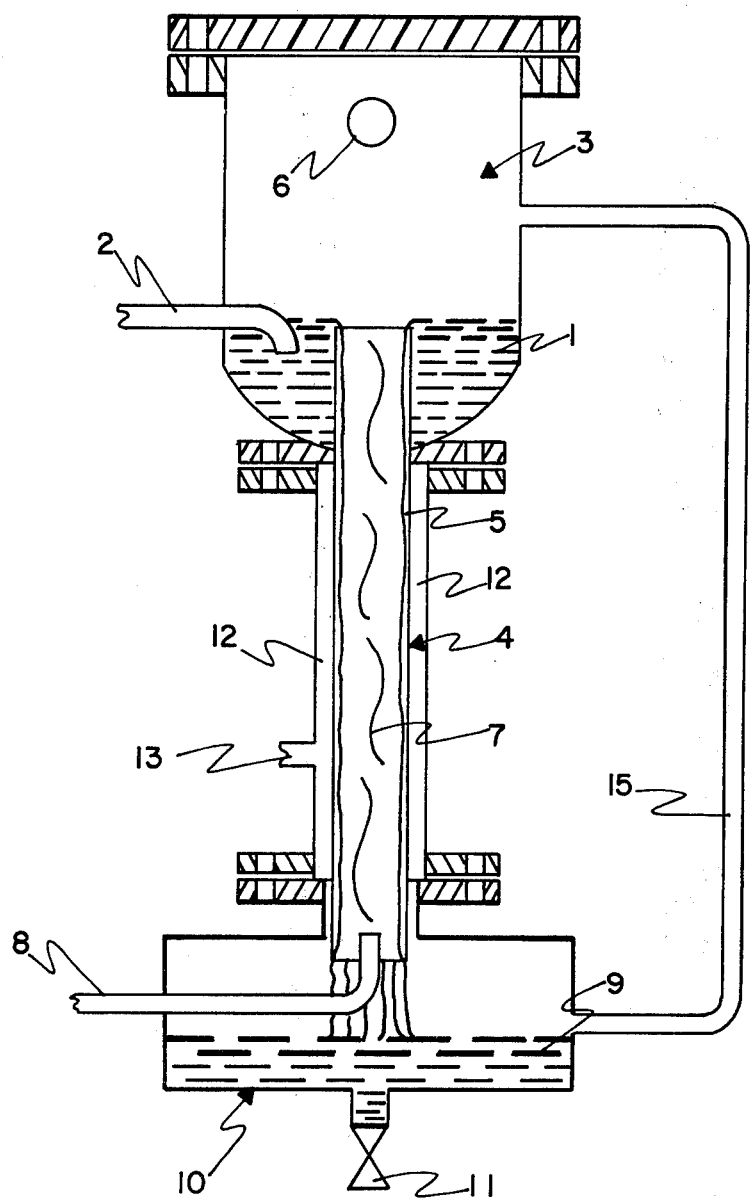
FIG. 1 is a schematic cross-sectional view of an apparatus in which the process of the present invention might be performed.

The method of the present invention can be further understood by reference to the Drawings. FIG. 1 shows an apparatus in which the method of the present invention might be carried out. An aqueous latex 1 of a synthetic polymer, such as polyvinyl chloride, which contains unreacted residual monomer in either the polymer particles contained therein, the aqueous medium or both, is introduced via line 2 in non-atomized form into a distributor reservoir 3 without the application of any substantial mechanical shear stress to the latex. The latex overflows the top of substantially vertical column 4 forming a thin liquid film 5 which flows down the interior surface of column 4. The interior of the column is maintained at subatmospheric pressure by vacuum line 6 and the thin film 5 of latex 1 flows countercurrent to an ascending flow of steam 7 which is introduced near the bottom of column 5 by inlet pipe 8. The treated latex 9 can be recovered from reservoir 10, e.g., by suitable drain means 11. The apparatus also has a heated jacket section 12 into which hot water or steam can be pumped by line 13 to heat the latex to achieve a faster removal of residual monomer, if desired. The internal subatmospheric pressure within the apparatus can be equalized by means of equalization tube 15 if the pressure variation is sufficiently great and the apparatus is small.

Figure 2:
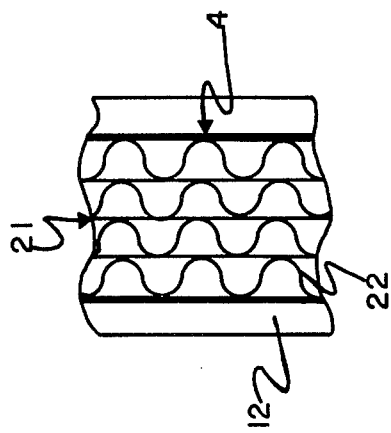
FIG. 2 is a cross-sectional view from the side of a type of packing element which can be used in the apparatus shown in FIG. 1.

FIG. 2 shows a section of the column 4 wherein a packing element 21 has been inserted to aid in the removal of residual monomer from the latex. The packing comprises a series of fluted surfaces 22 arranged substantially planar to the direction of flow of the latex.

Figure 3:
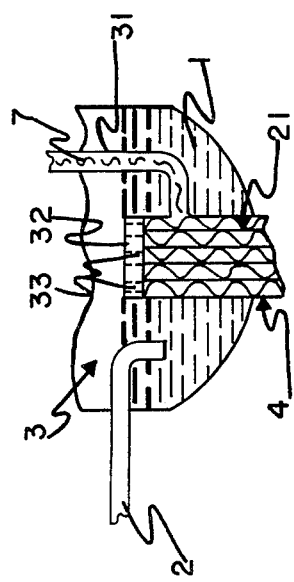
FIG. 3 is a cross-sectional view of a modified design for a portion of the apparatus shown in FIG. 1.

FIG. 3 shows a modified version of the type of apparatus shown in FIG. 1 wherein the upper end of substantially vertical column 4 has been capped with a conventional distributor cap 32 having a plurality of holes 33 formed therein to allow for proper distribution of latex 1 to packing element 21. A stove pipe connection 31 is provided in the sidewall of column 4 to allow for release of steam 7 without the buildup of pressure that would tend to unseat the distributor cap 32 at high steam flowrates.

The present method is useful for removing residual monomer from a synthetic polymer or resin. The present invention will be more particularly described in connection with removing VCM from PVC resin, but it would also be useful in the removal of residual, unreacted monomer from aqueous latices containing other types of synthetic rubbers or resins including, butadiene rubber, styrene-butadiene rubber, butadiene-acrylonitrile rubber, polyvinyl acetate, ethylene-vinyl acetate copolymer, polystyrene, polychloroprene, and the like.

The column 4 used in the method of the invention is conveniently a cylindrical tube for all or for most of its length, although columns of other cross-section could be employed. The top part of the apparatus, into which the latex is fed, is of wider diameter than the column 4 so that it forms a distributor reservoir 3 for the latex 1. The upper part of column 4 communicates with the distributor reservoir 3 so that a thin film 5 of the latex 1 can flow down the column 4 when the level of latex 1 in the reservoir is sufficiently high to thereby be treated with steam 7 at subatmospheric pressure. It is to be understood that the method of the invention may employ a plurality of such columns 4 which are operated contemporaneously or sequentially. It is also to be understood that "vertical" is meant to embrace "substantially vertical" so that slightly sloping columns are to be included within the scope of the invention but such columns are not preferred since they are less efficient due to less than full wall coverage by the latex.

The aqueous latex which is to be treated in accordance with the present invention can be preheated, if desired, to enhance the removal of monomer therefrom when treated in accordance with the present invention if such heating will not adversely affect the properties of the polymer. Alternatively, if such heating of the latex is desired, the column might be jacketed, as shown in FIG. 1, and the jacket 13 might be filled with a hot liquid, e.g., either hot water or steam, in order to achieve the desired degree of heating. Should such heating be undesirable, the treatment of the latex with steam at subatmospheric pressure might be carried out at comparatively lower temperatures by suitably regulating the flow of the latex, film thickness, flow of steam and pressure so as to carry out the desired removal of monomer.

The latex 1 flows down the interior of the column 4 in the form of a uniform, thin film 5 countercurrent to the ascending flow of steam. The diameter of the column 4 can be varied depending upon the properties of the particular latex or latices which are to be treated. The use of larger diameter columns will be required as a greater quantity of monomer is to be removed, and when the latices which are to be processed become apt to foam. However, as the diameter is increased it becomes increasingly more desirable from the standpoint of greater active surface area for latex treatment to rather use a multiple array of columns each having a smaller diameter than a single large column. Generally, column diameters of from about 25 mm. to about 150 mm. would be satisfactory for pilot scale units and diameters of up to 1800 mm. would be useful in production plant units. The length of the column 4 is also determined according to the amount of monomers in the latex, the properties of the latex, the flow rates of latex and steam, the pressure and temperature in the column, and so forth. Generally, columns having a length of from about 0.9 m. to about 7.2 m. will be appropriate for pilot scale units and lengths up to about 18 m. for production plant units. Furthermore, the flow rate of the latex will be interdependent upon the various factors mentioned hereinbefore. Generally, the quantity of latex to be treated is dependent upon the column surface area (plus packing surface area, if a packing is used). The quantity of latex can, for example, range from about 0.02 gm./min. to about 0.60 gm./min. per square centimeter of column area (plus area of packing surface, if used). If the flow rate is decreased below this range the efficiency of the column is reduced, whereas raising the flow rate tends to cause flooding of the column 4.

The film thickness of the latex as it flows down the column 4 will generally range from about 0.1 mm. to about 1.0 mm. Films that are too thin cause a decrease in tower efficiency whereas films which are too thick result in insufficient treatment of latex. The film thickness in accordance with the present invention is substantially smaller than the radius of the column 4 so as to provide sufficient space for the passage of steam through the column.

The flow rate of the steam in the column 4 must be sufficient to remove residual monomer from the thin film 5 of latex without causing foaming. The temperature of the steam must also not be so high as to cause damage to heat sensitive polymers if such are treated. In general terms flow rates of from about 2 kg/hr. to about 60 kg/hr. and temperatures for the steam of about 60° C. to about 99° C. are useful in connection with the present invention. In order to achieve the above described temperatures for the steam, subatmospheric pressure of from about 150 mm. to about 759 mm. (Hg) may be applied to the interior of column 4.

The following Examples serve to illustrate certain preferred embodiments of the present invention.

EXAMPLES 1-3

These Examples illustrate the results that were obtained when a PVC emulsion resin latex was stripped of residual VCM using the process of the present invention.

An apparatus was constructed similar to the type shown in FIG. 1. In this apparatus the latex of PVC was exposed as a thin film as it flowed down the interior walls of a 3 foot (0.914 m.) long, 4 inch (10.2 cm.) diameter vertical pipe. Steam was introduced near the base of the veritcal pipe to both heat the latex and to reduce the partial pressure of VCM in the vapor. Stripping of the latex occurred in the apparatus under such conditions with no loss in its mechanical stability.

Tables 1-3 set forth the results that were obtained in a series of runs under differing conditions using latex samples having somewhat different initial amounts of residual VCM. The results given in Tables 1 and 2 show "one-shot" stripping runs, whereas in Table 3 the same latex is recirculated through the apparatus. Those runs marked with an asterisk indicate comparative runs and are not part of the present invention. These runs were made on a 10.2 cm. diameter, 0.914 meter long, unpacked column. The data in Tables 1-3 demonstrate the importance of the presence of steam to cause the removal of vinyl chloride monomer from the latex.

TABLE 1

| | Wt. % VCM on PVC | | | CONDITIONS | | | | |
|---|---|---|---|---|---|---|---|---|
| Run No. | Feed Sample | Stripped Sample | Wt. % VCM Removed | Vac. (mm.Hg) | Steam (kg/hr.) | Latex Flow (gm/min.) | Temp. (° C.) | Film Thick. (mm.) |
| 1* | 3.05 | 2.68 | 12 | None | None | 280 | 21.1 | 0.3 |
| 2* | 3.05 | 2.82 | 7.5 | None | None | 280 | 21.1 | 0.3 |
| 3* | 3.05 | 2.62 | 14.1 | 254 | None | 280 | 21.1 | 0.3 |
| 4* | 3.05 | 2.12 | 30.5 | 254 | None (N2) | 280 | 21.1 | 0.3 |
| 5 | 3.05 | 0.72 | 76.4 | 254 | 54.7 | 280 | (hot) | 0.3 |
| 6* | 5.03 | 3.03 | 39.8 | 254 | None | 285 | 21.1 | 0.3 |
| 7 | 5.03 | 2.0 | 60.2 | 254 | 3.49 | 285 | 21.1 | 0.3 |
| 8 | 5.03 | 1.72 | 65.8 | 254 | 3.49 | 285 | 21.1 | 0.3 |
| 9 | 5.03 | 2.0 | 60.2 | 254 | 3.49 | 285 | 21.1 | 0.3 |
| 10 | 2.4 | 1.3 | 45.8 | 254 | 3.49 | 285 | 21.1 | 0.3 |
| 11 | 4.0 | 0.45 | 88.75 | 254 | 12.65 | 287 | 48.9 | 0.3 |

TABLE 2

| | Wt. % VCM on PVC | | | CONDITIONS | | | | |
|---|---|---|---|---|---|---|---|---|
| Run No. | Feed Sample | Stripped Sample | Wt. % VCM Removed | Vac. (mm.Hg) | Steam (kg/hr.) | Latex Flow (gm/min) | Temp. (° C.) | Film Thick. (mm.) |
| 1 | 1.98 | 1.06 | 46.5 | 254 | 3.62 | 297 | 47.2 | 0.3 |
| 2 | 1.98 | 0.48 | 75.8 | 254 | 4.71 | 297 | 47.2 | 0.3 |
| 3 | 1.98 | 0.76 | 61.6 | 254 | 4.71 | 158 | 47.8 | 0.26 |
| 4 | 1.46 | 1.03 | 29.4 | 254 | 3.62 | 280 | 43.3 | 0.3 |
| 5 | 1.03 | 0.8 | 22.3 | 254 | 4.30 | 280 | 44.4 | 0.3 |
| 6 | 1.46 | 0.8 | 45.2 | 254 | 4.30 | 280 | 44.4 | 0.3 |
| 7 | 1.2 | 0.56 | 53.3 | 254 | 4.17 | 280 | 47.8 | 0.3 |
| 8 | 0.73 | 0.65 | 11 | 254 | 3.17 | 280 | 34.4 | 0.3 |

TABLE 3

| | | Wt. % VCM on PVC | | | CONDITIONS | | | | |
|---|---|---|---|---|---|---|---|---|---|
| Run No. | Time (hrs.) | Feed Sample | Stripped Sample | Wt. % VCM Removed | Vac. (mm.Hg) | Steam (kg/hr.) | Latex Flow (gm/min) | Temp. (° C.) | Film Thick (mm.) |
| 1 | 1 | 3.21 | 0.66 | 80.1 | None | 13.29 | 295 | 52.8 | 0.3 |
| 2 | 2 | 0.66 | 0.24 | 92.6 | None | 13.29 | 295 | 66.7 | 0.3 |
| 3 | 3 | 0.24 | 0.094 | 97.2 | None | 13.29 | 295 | 68.3 | 0.3 |
| 4 | 4 | 0.094 | 0.056 | 98.3 | None | 13.29 | 295 | 70.0 | 0.3 |

EXAMPLE 4

This Example illustrates the stripping of VCM from PVC latex in a packed column as indicated in FIG. 2. The results are shown in the Table which follows. The column in this series of runs was 10.2 cm. in diameter, 2.4 meters long, and contained 3.4 m². of packing surface. The additional surface area provided by the packing permitted a much higher flow to achieve an equivalent vinyl chloride monomer content in the stripped latex.

TABLE 4

| | Wt. % VCM on PVC | | | CONDITIONS | | | | | | |
|---|---|---|---|---|---|---|---|---|---|---|
| Run No. | Feed Sample | Stripped Sample | Latex % Solids | Wall Temp. (° C.) | Steam (kg/hr) | Vac (mm.Hg) | Latex Flow (kg/min) | Total Latex added (kg.) | % Latex Recovered (%) | Latex Temp.[2] (° C.) |
| 1 | 1.439 | 0.074 | 30.0[1] | 75 | 13.2 | 584.2 | 1.26 | 35.4 | — | 70 |
| 2 | 1.439 | 0.185 | 35.2 | 74.5 | 13.2 | 579.1 | 1.77 | 43.5 | 92.5 | 68.5 |
| 3 | 1.439 | 0.267 | 36.0 | 75 | 13.2 | 584.2 | 2.63 | 55.3 | 99.3 | 67 |
| 4 | 1.439 | 0.320 | 35.8 | 75 | 13.2 | 584.2 | 3.65 | 72.1 | 100 | 65 |
| 5 | 1.439 | 0.700 | 35.1 | 75 | 13.2 | 586.7 | 5.75 | 109.3 | 100 | 60.5 |

[1]The percent solids content of the feed latex was 36.8%. In Run No. 1 some greater amount of dilution occurred due to accumulation of water in the distributor section of the apparatus during steam heat-up of the column.
[2]The latex temperature was measured in the reservoir of the stripping apparatus.

EXAMPLE 5

This Example illustrates the removal of VCM from PVC latex in a series of runs conducted with the use of hot water in the jacket of the apparatus shown in FIG. 1 and an internal steam sparging of the latex. The results are given in the Table which follows. In this Example an unpacked column was utilized having a diameter of 5.1 cm. and a length of 4.8 meters. In these data the sensitivity of vinyl chloride monomer removal to flow rate changes of steam and latex is shown.

TABLE 5

| | Wt. % VCM on PVC | | | CONDITIONS | | | | | | |
|---|---|---|---|---|---|---|---|---|---|---|
| Run No. | Feed Sample | Stripped Sample | Latex % Solids[1] | Wall Temp. (° C.) | Steam (kg/hr) | Vac (mm.Hg) | Latex Flow (kg/min) | Total Latex added (kg.) | % Latex Recovered (%) | Latex Temp. (° C) |
| 1 | 3.48 | 0.386 | 26.5 | 75 | 3.0 | 508.0 | 0.45 | 13.6 | 97 | 70 |
| 2 | 3.48 | 0.328 | 31.4 | 75 | 3.6 | 538.5 | 0.47 | 13.6 | 97.8 | 73 |
| 3 | 3.48 | 0.107 | 29.6 | 75 | 6.0 | 533.4 | 0.30 | 13.6 | 93.0 | 73 |
| 4 | 3.48 | 0.258 | 30.6 | 75 | 3.6 | 530.9 | 0.75 | 13.6 | 110.0[2] | 67 |

[1]The % solids of the feed latex was 35.8%.
[2]includes some material from previous run.

EXAMPLE 6

This Example illustrates removal of VCM from PVC latex in the type of apparatus used in Example 5 using higher feed rates of latex and steam under conditions where the product from a previous run is recycled through the apparatus. The Table which follows sets forth the results which were obtained. Again, an unpacked column having a diameter of 5.1 cm. and a length of 4.8 meters was used. The data show that high latex flow rates led to only a moderate reduction of vinyl chloride monomer in the latex.

TABLE 6

| | Wt. % VCM on PVC | | | CONDITIONS | | | | | | |
|---|---|---|---|---|---|---|---|---|---|---|
| Run No. | Feed Sample | Stripped Sample | Latex % Solids[1] | Wall Temp. (° C.) | Steam (kg/hr) | Vac (mm.Hg) | Latex Flow (kg/min) | Total Latex added (kg.) | % Latex Recovered (%) | Latex Temp. (° C.) |
| 1 | 2.446 | 1.167 | 38.9 | 76 | 3.6 | 546.1 | 3.35 | 67 | — | 56 |
| 2 | 1.167 | 0.815 | 38.6 | 76 | 3.6 | 596.9 | 4.00 | 68 | 99.0 | 55 |
| 3 | 0.815 | 0.682 | 38.2 | 76 | 3.6 | 569 | 4.16 | 68 | 99.3 | 60 |
| 4 | 0.682 | 0.358 | 37.5 | 77 | 3.6 | 599.4 | 3.77 | 68 | 99.2 | 63 |
| 5 | 0.358 | 0.214 | 36.8 | 77 | 3.6 | 599.4 | 4.10 | 68.5 | 99.3 | 64 |
| 6 | 0.214 | 0.168 | 36.3 | 78.5 | 3.6 | 591.8 | 4.22 | 68.7 | 98.9 | 63 |
| 7 | 0.168 | 0.119 | 35.9 | 76 | 3.6 | 607.1 | 3.91 | 68.5 | 99.5 | 64 |

[1]The initial % solids of the latex was 37.4%.

What is claimed is:

1. A process for removal of unreacted, residual monomer from an aqueous latex of polymer which comprises introducing the latex without any substantial mechanical shear stress being imparted thereto to a substantially vertical column so that it flows down the interior surface of said column in a thin film countercurrent to a flow of steam while being maintained at subatmospheric pressure.

2. A process as claimed in claim 1 wherein the polymer is selected from the group consisting of polyvinyl chloride, butadiene rubber, styrene-butadiene rubber, butadiene-acrylonitrile rubber, polyvinyl acetate, ethylene-vinyl acetate copolymer, polystyrene, and polychloroprene.

3. A process as claimed in claim 1 wherein the polymer is a vinyl chloride polymer.

4. A process as claimed in claim 1 wherein the steam is at a temperature of about 60° C. to about 99° C.

5. A process as claimed in claim 1 wherein the thickness of the film varies from about 0.1 mm. to about 1.0 mm.

6. A process as claimed in claim 1 wherein the column has a diameter of from about 25 mm. to about 1800 mm.

7. A process as claimed in claim 1 wherein the column has a length of from about 0.9 to about 18 m.

8. A process as claimed in claim 1 wherein the latex is introduced at a flow rate of from about 0.02 to about 0.60 gm/min. per square centimeter of surface area.

9. A process as claimed in claim 1 wherein the subatmospheric pressure is from about 150 to about 749 mm. of mercury.

10. A process as claimed in claim 1 wherein the flow rate of the steam ranges from about 2 kg./hr. to about 60 kg./hr.

* * * * *